United States Patent [19]

Sommer

[11] Patent Number: 5,947,244
[45] Date of Patent: *Sep. 7, 1999

[54] PRESS DRIVE WITH OIL SHEAR CLUTCH/BRAKE UNITS

[75] Inventor: Gordon Maurice Sommer, Grosse Pointe Shores, Mich.

[73] Assignee: Midwest Brake Bond Company, Warren, Mich.

[*] Notice: This patent is subject to a terminal disclaimer.

[21] Appl. No.: 08/900,229

[22] Filed: Jul. 24, 1997

[51] Int. Cl.⁶ .................................................. F16D 67/04
[52] U.S. Cl. ............................................................ 192/18 A
[58] Field of Search .................................... 192/15, 18 A, 192/113.31, 113.34, 70.2

[56] References Cited

U.S. PATENT DOCUMENTS

| | | | |
|---|---|---|---|
| 2,242,396 | 5/1941 | Johansen | 192/18 A |
| 2,848,082 | 8/1958 | Dehn | 192/12 C |
| 2,870,655 | 1/1959 | Rockwell . | |
| 3,077,252 | 2/1963 | Treer . | |
| 3,182,776 | 5/1965 | Sommer . | |
| 3,441,114 | 4/1969 | Pensa | 192/221 |
| 3,494,450 | 2/1970 | Mankowsky et al. . | |
| 3,605,963 | 9/1971 | Roob et al. . | |
| 3,614,999 | 10/1971 | Sommer . | |
| 3,713,517 | 1/1973 | Sommer . | |
| 3,835,971 | 9/1974 | Spanke et al. . | |
| 3,946,840 | 3/1976 | Sommer . | |
| 4,095,523 | 6/1978 | Drungil | 192/18 A X |
| 4,122,926 | 10/1978 | Spanke et al. . | |
| 4,135,611 | 1/1979 | Spanke . | |
| 4,186,827 | 2/1980 | Spanke . | |
| 4,346,796 | 8/1982 | Ueno | 192/18 A |
| 4,432,443 | 2/1984 | Sommer . | |
| 4,472,077 | 9/1984 | Sommer . | |
| 4,562,907 | 1/1986 | Maeda | 192/18 A |
| 4,785,926 | 11/1988 | Matson . | |
| 5,190,129 | 3/1993 | Sommer . | |
| 5,462,147 | 10/1995 | Sherman . | |
| 5,487,456 | 1/1996 | Sommer | 192/18 A |
| 5,657,843 | 8/1997 | Sommer . | |
| 5,769,187 | 6/1998 | Sommer | 192/18 A X |
| 5,806,641 | 9/1998 | Sommer | 192/18 A |

Primary Examiner—Charles A. Marmor
Assistant Examiner—Saúl Rodriguez
Attorney, Agent, or Firm—Harness, Dickey & Pierce, PLC

[57] ABSTRACT

A drive unit for driving a press uses a hydraulically actuated oil shear brake unit located on one side of a flywheel and a hydraulically actuated oil shear clutch unit located on the opposite side of the flywheel. The actuating assemblies for the oil shear brake unit and the oil shear clutch unit can be supplied as complete assemblies which are secured to the brake housing and clutch housing, respectively, at the time of assembly of the units to the press. The actuation of the clutch unit and the brake unit occur simultaneously and from the same hydraulic pressure source such that the overlap between the two units is controllable from no overlap to a specified amount of overlap where the brake unit is applied simultaneously with the engagement of the clutch for a specified amount of time.

22 Claims, 2 Drawing Sheets

5,947,244

PRESS DRIVE WITH OIL SHEAR CLUTCH/BRAKE UNITS

FIELD OF THE INVENTION

The present invention relates to press drives. More particularly the present invention relates to a single speed press drive using an oil shear clutch unit disposed on one side of a flywheel and an oil shear brake unit disposed on the opposite side of the flywheel.

BACKGROUND OF THE INVENTION

Dry friction clutch/brakes depend upon the rubbing of a dry friction material against dry reaction members to start and stop a press. This continuous dry rubbing causes wearing of both the friction material and the reaction members as well as causing the generation of heat in these members. The faster the press operates and the faster the flywheel rotates, greater is the amount of wear and heat which are generated. This generation of wear and heat requires periodic gap adjustment between the friction plates and the reaction members to keep the clutch/brakes functioning and the press operating correctly. The trip rate or cycle speed of a press equipped with a dry friction clutch/brake unit is limited because the mass of the unit determines its heat dissipation capacity. If the mass of the unit is increased to increase its heat dissipation capacity, the inertia that must be started and stopped is also increased. These factors define a closed loop from which it is impossible to escape when trying to substantially increase the performance of the system.

Oil shear brake and clutch units have been developed to eliminate the problems associated with the dry friction type of units. The oil shear systems use hydraulic actuation instead of air actuation and the units have been developed with key modules which can be easily adapted to be mated with the various types of presses. Properly designed oil shear clutch/brake drives offer the advantage of little or no wear of plates in the disk stacks and no brake fade. This provides a more precise operation of the press and dramatically increases press up-time. The oil film between the adjacent disks carries the heat generated by the start-stops of the unit away from the disk stacks. This removal of heat offers the advantage that there is now no practical limit for the press trip rate and the flywheel speed. In addition, this removal of heat provides unlimited inching capabilities.

While these oil shear clutch/brake drive units have significantly improved the operation of the units, they have all been supplied as single units which have the clutch and brake units interfaced using various techniques for the engagement and disengagement of the clutch and for the application and release of the brake. The various techniques for the operation of the clutch and brake units operation have all been directed toward the problem of providing a specified amount of overlap between the two units. Accordingly, what is needed is a versatile press drive system which incorporates the flexibility to be applied to a wider variety of presses where size and performance of the press drive system are of the utmost importance. In addition, the press drive system should simplify the coordination and operation of the brake and clutch units while keeping the press drive system at reasonable cost levels.

SUMMARY OF THE INVENTION

The present invention provides the art with a press drive system which uses an oil shear brake and an oil shear clutch drive. The clutch system of the present invention uses a disk stack of multiple disks and is located on one side of a flywheel. The brake system of the present invention also uses a disk stack of multiple disks and is located on the opposite side of the flywheel. The oil shear system of the present invention utilizes all the advantages associated with the oil shear technology while the separation of the brake and clutch units and placing them on opposite sides of the flywheel minimizes the amount of space required for the unit on any single side of the flywheel. This combination provides a unique oil shear clutch/brake unit which can be assembled to virtually any press drive system utilizing a minimum amount of space. In addition, the separation of the two units provides the flexibility to design into the units the coordination between the operation of the brake unit and the operation of the clutch unit to provide a specified amount of overlap. The present invention is designed to reduce the number of components and simplify the assembly of the press drive system.

Other advantages and objects of the present invention will become apparent to those skilled in the art from the subsequent detailed description, appended claims and drawings.

BRIEF DESCRIPTION OF THE DRAWINGS

In the drawings which illustrate the best mode presently contemplated for carrying out the present invention.

DETAILED DESCRIPTION OF THE PREFERRED EMBODIMENT

Figure 1:
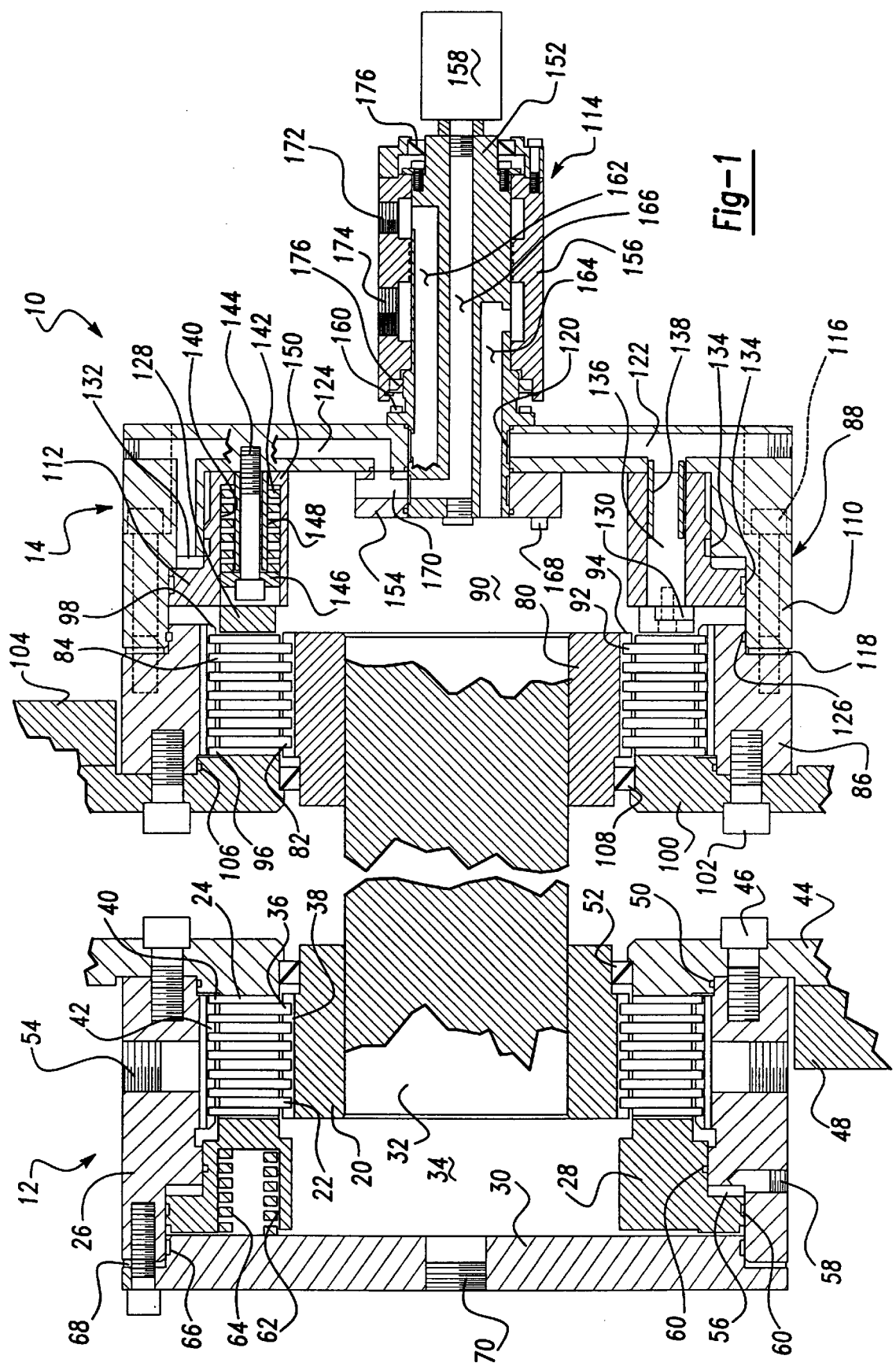
FIG. 1 is a side view, partially in cross-section, of a press drive assembly in accordance with the present invention located on opposite sides of a flywheel.

Referring now to the drawings in which like reference numerals designate like or corresponding parts throughout the several views, there is shown in FIG. 1, a unique press drive assembly in accordance with the present invention which is designated generally by the reference numeral 10. Press drive assembly 10 comprises an oil shear brake assembly 12 and a separate oils shear clutch assembly 14.

Brake assembly 12 includes a brake reaction hub 20, a plurality of brake friction plates 22, a plurality of brake reaction plates 24, a brake housing 26, a brake engagement member 28 and an end cover 30. Brake reaction hub 20 is drivingly connected to a driveshaft 32 of the press to which press drive assembly 10 is being attached. Hub 20 is configured to sealingly mate with the existing driveshaft of the press and is secured to driveshaft 32 by means known well in the art such that hub 20 and driveshaft 32 rotate together. Once driveshaft 32 has been secured to hub 20, an oil tight chamber 34 is defined within brake assembly 12. Chamber 34 is supplied with cooling oil for oil shear brake assembly 12 as will be described later herein.

The plurality of brake friction plates 22 have spline means 36 located on their interior surface for engagement with spline means 38 disposed on the exterior of hub 20. The spline engagement between plates 22 and hub 20 is such that plates 22 and hub 20 will rotate together but plates 22 are allowed to move axially along spline means 38 of hub 20. Interjected or interleaved between the plurality of brake friction plates 22 are the plurality of brake reaction plates 24. Brake reaction plates 24 have spline means 40 located on their exterior surface for the engagement with spline means 42 disposed on the interior of brake housing 26. The spline engagement between plates 24 and brake housing 26 is such that plates 24 are prohibited from rotating with respect to brake housing 26 but plates 24 are allowed to move axially along spline means 42 of brake housing 26.

Brake housing 26 is secured to an adaptor plate 44 by a plurality of bolts 46. Adaptor plate 44 is fixedly secured to the frame or a stationary member 48 of the press to provide an anchoring point for brake assembly 12. In the alternative, adaptor plate 44 can be secured to any other non-moving member adjacent the press. A first seal 50 is disposed between adaptor plate 44 and brake housing 26 and a second seal 52 is disposed between adaptor plate 44 and hub 20 to maintain the integrity and oil tightness of chamber 34. Brake housing 26 defines a cooling oil inlet 54 extending through its exterior wall to provide coolant to brake assembly 12 as will be described later herein.

Brake engagement member 28 is disposed within sealed chamber 34. Brake engagement member 28 is slidingly received within brake housing 26 and moves axially within brake housing 26 to apply or release brake assembly 12. Brake engagement member 28 and brake housing 26 define an activation chamber 56 which receives pressurized fluid for applying and releasing brake assembly 12. An activation port 58 extends through brake housing 26 to provide access to chamber 56. A pair of seals 60 disposed between brake engagement member 28 and brake housing 26 isolates activation chamber 56 from chamber 34. Brake engagement member 28 defines a plurality of spring pockets 62 within each of which is disposed a biasing spring 64. Springs 64 react against end cover 30 to bias brake engagement member 28 to the right as shown in FIG. 1 to compress plates 22 and 24 and thus apply brake assembly 12.

End cover 30 is secured to brake housing 26 by a plurality of bolts. A seal 66 is disposed between end cover 30 and brake housing 26 to maintain the integrity and oil tightness of chamber 34. A spacer 68 is located between end cap 30 and brake housing 26 to eliminate the tolerance buildup between the various components of brake assembly 12 and thus provides an accurate setting for the biasing load being applied by springs 64 and the travel for engagement member 28. Springs 64 react against end cover 30 allowing the load adjustment by using spacer 68. End cover 30 defines an oil outlet 70 which is centrally located within end cover 30.

The cooling oil flow for brake assembly 12 enters chamber 34 through inlet 54 on the outer circumference of brake housing 26. The oil proceeds through plates 22 and 24 to provide oil for the oil shear operation of brake assembly 12 and the removal of heat from plates 22 and 24. The cooling oil continues to the inside of chamber 34 and is removed from centrally located outlet 70 in end cover 30. The centrifugal force created by the rotation of hub 20 and plates 22 will impede the oil flow of the present invention because oil is fed to the outside of chamber 34 and removed from the inside of chamber 34. The supply of oil to the outside of chamber 34 in combination with the centrifugal force produced by the rotation of hub 20 and plates 22 will tend to keep the oil in the outside portion of chamber 34 and in contact with plates 22 and 24. Thus, any momentary delay in the supply will not starve brake assembly 12 and plates 22 and 24 will remain bathed in oil to provide an unexpected increase in the performance of brake assembly 12. In addition, any "hot spots" which may be created between adjacent plates 22 and 24 will increase the temperature of the oil in that localized area making this higher temperature oil lighter and thus less affected by centrifugal force. This lighter oil will tend to migrate to the inside of chamber 34. The cooler, heavier oil will be forced by centrifugal force to the outside of chamber 34 and into contact with plates 22 and 24 increasing the cooling rate for the developed "hot spot".

The operation of brake assembly 12 begins with brake assembly 12 being in the applied condition due to the biasing of brake engagement member 28 by the plurality of springs 64. Brake engagement member 28 compresses the plurality of friction plates 22 and the plurality of reaction plates 24 together and against adapter plate 44. In this applied condition, rotation of driveshaft 32 is prohibited by the fact that brake reaction hub 20, which is locked to driveshaft 32, is locked to adapter plate 44 which is in turn secured to stationary member 48. When it is desired to release brake assembly 12, fluid under pressure is supplied to chamber 56 through inlet 58. Pressurized fluid within chamber 56 causes brake engagement member 28 to move axially to the left as shown in FIG. 1 against the biasing of springs 64. When brake engagement member 28 moves to the left, the compression between the plurality of friction and reaction plates 22 and 24, respectively, is released and plates 22 are free to rotate relative to plates 24 which allows driveshaft 32 to rotate. When the pressurized fluid is released from chamber 56, brake assembly 12 is again urged into its applied condition due to the biasing of springs 64.

Clutch assembly 14 includes a clutch reaction hub 80, a plurality of clutch friction plates 82, a plurality of clutch reaction plates 84, a clutch housing 86 and a clutch engagement assembly 88. Clutch reaction hub 80 is drivingly connected to driveshaft 32 of the press to which press drive assembly 10 is being attached. Hub 80 is configured to sealingly mate with the existing driveshaft of the press and is secured to driveshaft 32 by means known well in the art such that hub 80 and driveshaft 32 rotate together. Once driveshaft 32 has been secured to hub 80, an oil tight chamber 90 is defined within brake assembly 12. Chamber 90 is supplied with cooling oil for oil shear clutch assembly 14 as will be described later herein.

The plurality of clutch friction plates 82 have spline means 92 located on their interior surface for the engagement with spline means 94 located on the exterior surface of hub 80. The spline engagement between plates 82 and hub 80 is such that plates 82 and hub 80 will rotate together but plates 82 are allowed to move axially along spline means 94. Interjected or interleaved between the plurality of clutch friction plates 82 are the plurality of clutch reaction plates 84. Clutch reaction plates 84 have spline means 96 located on their exterior surface for the engagement with spline means 98 disposed on the interior of housing 86. The engagement between plates 84 and housing 86 is such that plates 84 are prohibited from rotating with respect to housing 86 but plates 84 are allowed to move axially along spline means 98 of housing 86.

Clutch housing 86 is secure to an adaptor plate 100 by a plurality of bolts 102. Adaptor plate 100 is fixedly secure to the flywheel 104 of the press to provide rotational input to press drive assembly 10. A first seal 106 is disposed between adaptor plate 100 and clutch housing 86 and a second seal 108 is disposed between adaptor plate 100 and clutch hub 80 to maintain the integrity and oil tightness of chamber 90.

Clutch engagement assembly 88 comprises a housing 110, a clutch engagement member 112 and an oil supply assembly 114. Housing 110 is a generally cup shaped member which is secure to clutch housing 86 using a plurality of bolts 116. A spacer 118 is located between housing 110 and clutch housing 86 to eliminate tolerance build up between the components of clutch assembly 14 and accurately set the amount of travel for engagement member 112. Housing 110 defines a centrally located lubricant bore 120, a cooling oil passage 122 and an activation passage 124. Bore 120 and passages 122 and 124 are utilized in providing lubricating fluid and pressurized fluid for the operation of clutch assembly 14. A seal 126 disposed between clutch housing 86 and housing 110 maintains the integrity and oil tightness of chamber 90.

Clutch engagement member 112 is disposed within chamber 90. Clutch engagement member 112 is slidingly received within housing 110 and moves axially within housing 110 to engage or disengage clutch assembly 14. An abutment housing 128 is attached to clutch engagement member 112 and it defines an oil outlet port 130 which provides cooling oil to chamber 90 as will be described later herein. Clutch engagement member 112 and housing 110 define an activation chamber 132 which receives pressurized fluid for applying and releasing clutch assembly 14. A pair of seals 134 disposed between clutch engagement member 112 and housing 110 isolates activation chamber 132 from chamber 90. Clutch engagement member 112 defines a cooling oil passage 136 which extends between cooling oil passage 122 of housing 110 and oil outlet port 130 of abutment housing 128. A sleeve 138 is secured to housing 110 and extends into passage 136 to accommodate the axial motion of clutch engagement member 112. Clutch engagement member 112 also defines a plurality of spring pockets 140 within which is disposed a biasing spring 142. Springs 142 are each secured to housing 110 using a bolt 144, a backing washer 146 and a preload spacer 148. Bolt 144 and spacer 148 extend through the center of spring 142 with spacer 148 being located between bolt 144 and spring 142. Washer 146 is positioned against the head of bolt 144 with spring 142 being located between spacer 148 and an annular shoulder 150 located within spring pocket 140. The preload for springs 142 will be determined by the length of spacer 148. Bolt 144 is threaded into housing 110 and is tightened until washer 146 and spacer 148 are compressed between the head of bolt 144 and housing 110. The length of spacer 148 will determine the working height of spring 142 which will then determine the load with which clutch engagement member 112 is biased to the right as shown in FIG. 1 or toward housing 110 which is into the disengaged condition. This assembly allows for the preloading of springs 142 prior to the final assembly of clutch assembly 14.

Oil supply system 114 comprises an oil housing 152, an end plate 154, a stationary input housing 156 and a rotary union 158. Oil housing 152 is secured to housing 110 using a plurality of bolts 160. Oil housing 152 extends through lubricant bore 120 and it defines a cooling oil inlet passage 162, a cooling oil outlet passage 164 and a fluid actuation passage 166. End plate 154 mates with the portion of oil housing 152 that extends through bore 120 and into chamber 90. End plate 154 is secured to housing 110 using a plurality of bolts 168 and it defines a fluid actuation passage 170. Stationary input housing 156 is rotatably supported by oil housing 152 and it defines a cooling oil inlet 172 which is in communication with inlet passage 162 and a cooling oil outlet 174 which is in fluid communication with outlet passage 164. A pair of seals 176 seal the interface between oil housing 152 and input housing 156. Rotary union 158 is threadingly received into the open end of fluid actuation passage 166.

The cooling oil flow for clutch assembly 14 enters oil inlet 172 of stationary input housing 156 and proceeds to inlet passage 162 of oil housing 152. The cooling oil flows through passage 162 and into cooling oil passage 122 of housing 110. The cooling oil then flows through sleeve 138 and into passage 136 of engagement member 112. From passage 136, fluid is directed through oil port 130 in abutment housing 128 to enter the outer circumferential portion of chamber 90. The cooling oil proceeds through plates 82 and 84 to provide oil for the oil shear operation of clutch assembly 14 and the removal of heat from plates 82 and 84 to provide oil for the oil shear operation of clutch assembly 14 and the removal of heat from plates 82 and 84. The cooling continues to the inner portion of chamber 90 and is removed through outlet passage 164 in oil housing 152, through oil outlet 174. The centrifugal force created by the rotation of hub 80, housing 86, plates 82 and plates 84 will impede the oil flow of the present invention because oil is fed to the outside of chamber 90 and removed from the inside of chamber 90. The supply of oil to the outside of chamber 90 in combination with the centrifugal force produced by the rotation of hub 80, plates 82, plates 84 and housing 86 will tend to keep the oil in the outside portion of chamber 90 and in contact with plates 82 and 84. Thus, any momentary delay in the supply will not starve clutch assembly 14 and plates 82 and 84 will remain bathed in oil to provide an unexpected increase in the performance of clutch assembly 14. In addition, any "hot spots" which may be created between adjacent plates 82 and 84 will increase the temperature of the oil in that localized area making this higher temperature oil lighter and thus less affected by centrifugal force. This lighter oil will tend to migrate to the inside of chamber 90. The cooler, heavier oil will be forced by centrifugal force to the outside of chamber 90 and into contact with plates 82 and 84 increasing the cooling rate for the developed "hot spot".

The operation of clutch assembly 14 begins with clutch assembly 14 being in the disengaged condition due to the biasing of clutch engagement member 112 by the plurality of coil springs 142 to cause engagement member 112 to move away from friction plates 82 and reaction plates 84. In this released position, flywheel 104 is free to rotate with respect to driveshaft 32 due to the fact that the plurality of friction plates 82 are free to rotate relative to the plurality of reaction plates 84. When it is desired to power driveshaft 32 by flywheel 104, fluid under pressure is supplied to chamber 132 through rotary union 158, passage 166, passage 170 and passage 124. Pressurized fluid within chamber 132 causes engagement member 112 to move axially to the left as shown in FIG. 1 against the biasing of coil springs 142. When engagement member 112 moves to the left, the plurality of friction plates 82 are urged against the plurality of reaction plates 84 causing engagement of clutch assembly 14 and the transferring of power from flywheel 104 to drive driveshaft 32. When the pressurized fluid is released from chamber 132, clutch assembly 14 is again urged into its disengaged condition due to the biasing of coil springs 142.

Brake assembly 12 operates to stop driveshaft 32 from rotating with respect to flywheel 104 and clutch assembly 14 operates to cause driveshaft 32 to be rotated by flywheel 104. Because these operations are opposite to each other, it is necessary to coordinate the application and release of brake assembly 12 with the engagement and disengagement of clutch assembly 14 to ensure that there is no overlap between the two assemblies. The present invention provides the unique coordination of operation of brake assembly 12 and clutch assembly 14 by designing the two assemblies 12 and 14 such that the coordination of their operation are designed into the assemblies. In one embodiment, the plurality of coil springs 64 and the plurality of coil springs 142 are designed to be generally identical in strength and number. Thus the urging force that applies brake assembly 12 and the urging force that disengages clutch assembly 14 is generally identical. In addition, the size and dimensions of chamber 56 are generally identical to the size and dimensions of chamber 132. Thus when the same pressurized fluid is supplied to both chambers 56 and 132 simultaneously, brake assembly 12 will release simultaneously to the engagement of clutch assembly 14. In a similar manner, the disengagement of clutch assembly 14 and the application of brake assembly 12 will also occur simultaneously with the simultaneous release of pressurized fluid from chambers 56 and 132 and the reaction caused by springs 64 and 142. This eliminates the overlap between brake assembly 12 and clutch assembly 14 without the need for mechanically interlocking the two assemblies.

In another embodiment, the plurality of coil springs 64 and the plurality of coil springs 142 are designed to be different in number and/or different in strength. Thus the urging force that applies brake assembly 12 and the urging force that disengages clutch assembly 14 will be different. In order to maintain the commonization of components, the size and dimensions of chamber 56 are left generally identical to the size and dimensions of chamber 132 although this is not a requirement. Thus when the same pressurized fluid is supplied to both chambers 56 and 132 simultaneously, brake assembly 12 will release either prior to or after the engagement of clutch assembly 14. Normally, the release of brake assembly 12 is designed to be after the engagement of clutch assembly 14 to provide a specified amount of overlap between the two assemblies. In a similar manner, the disengagement of clutch assembly 14 and the application of brake assembly 12 will not occur simultaneously with the simultaneous release of pressurized fluid from chambers 56 and 132 and the reaction caused by springs 64 and 142. Normally, the application of brake assembly 12 is designed to be before the disengagement of clutch assembly 14 to again provide a specific amount of overlap between the two assemblies. Thus, a specified amount of overlap can be designed into the assemblies without the need of mechanically interlocking the two assemblies.

Figure 2:
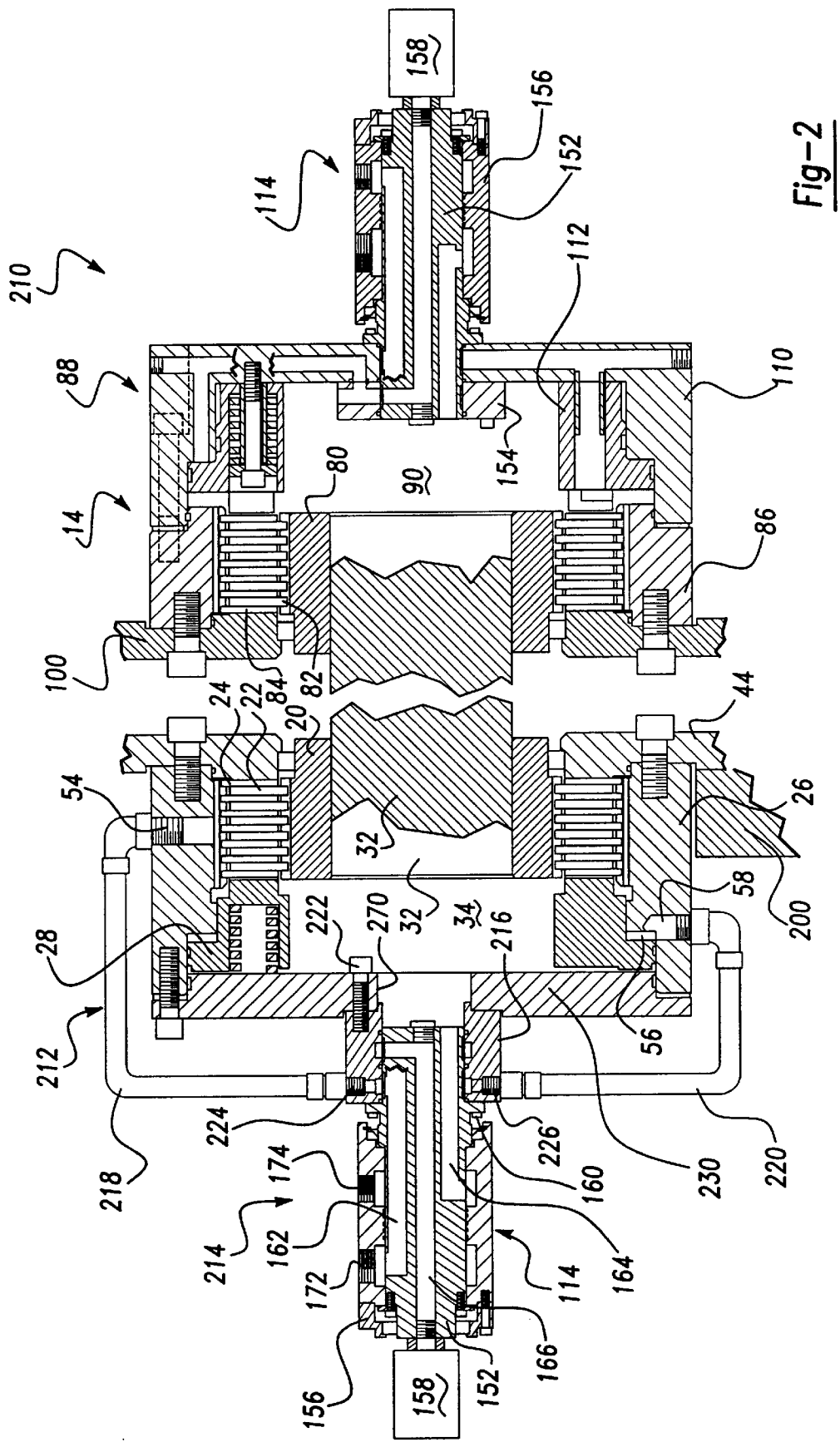
FIG. 2 is a side view, partially in cross-section of a press drive assembly in accordance with another embodiment of the present invention.

Referring to FIG. 2, there is shown a press drive assembly in accordance with another embodiment of the present invention which is designated generally by the reference numeral 210. Press drive 210 is identical to press drive assembly 10 with the exception of brake assembly 12 which has been replaced by brake assembly 212.

Brake assembly 12 of the previous embodiment is designed to be attached to stationary member 48 of the press. For some press designs, the brake assembly is designed to be attached to a rotational member such as a portion of an inching drive 200. Brake assembly 212 rotates with respect to driveshaft 32 to allow limited rotation of brake assembly 212 to provide for inching drive movements assembly 212 is identical to brake assembly 12 except that end cover 30 is replaced by end cover 230 and oil supply system 214 has been added. End cover 230 is secured to brake housing 26 by the plurality of bolts in the same manner as end cover 30. End cover 230 defines an oil outlet 270 which is centrally located within end cover 230.

Oil supply system 214 includes oil supply system 114, an adaptor 216, a cooling oil inlet pipe 218 and a actuation pipe 220. Adaptor 216 is secured to end cover 230 using a plurality of bolts 222. Adaptor 216 includes an oil outlet 224 and an actuation outlet 226. Cooling oil inlet pipe 218 extends between oil outlet 224 and oil inlet 54. Actuation pipe 220 extends between actuation outlet 226 and activation port 58. Oil supply system 114 is secured to adaptor 216 by the plurality of bolts 160. Once connected to adaptor 216, cooling outlet passage 164 is in communication with chamber 34 through oil outlet 270, inlet passage 162 is in communication with chamber 34 through oil outlet 224, pipe 218 and inlet 54 and actuation passage 166 is in communication with chamber 56 through actuation outlet 226, pipe 220 and activation port 58.

The operation and cooling for press drive assembly 210 is identical to that of press drive assembly 10 described above. The incorporation of oil supply system 214 permits the rotation of brake assembly 212 to enable it to be connected to an inching drive or another movable member of the press.

While the above detailed description describes the preferred embodiment of the present invention, it should be understood that the present invention is susceptible to modification, variation and alteration without deviating from the scope and fair meaning of the subjoined claims.

What is claimed is:

1. A drive assembly for a press having an inching drive, a flywheel, a frame and a drive shaft, said drive assembly comprising:

a brake assembly disposed on a first side of said flywheel, said brake assembly comprising:

means for securing said brake assembly to said inching drive;

input means for receiving rotary motion from said driveshaft, said input means being rotatable with respect to said securing means; and selectively operable brake means for locking said input means to said securing means, said brake means including a plurality of interleaved first friction disks alternately attached, respectively, to said securing means and said input means;

a clutch assembly disposed on a second side of said flywheel, said clutch assembly comprising:

means for attaching said clutch assembly to said flywheel;

output means for receiving rotary motion from said flywheel, said output means being secured to said driveshaft and rotatable with respect to said attaching means; and selectively operable clutch means for transmitting rotational motion of said attaching means to said output means, said clutch means including a plurality of interleaved second friction disks alternately attached, respectively, to said attaching means and said output means.

2. The press drive assembly according to claim 1 further comprising:

a first biasing member for urging said brake assembly from a released condition into an applied condition;

a second biasing member for urging said clutch assembly from an engaged condition into a disengaged condition; and means for controlling the operational timing of said clutch assembly and said brake assembly such that a specified amount of overlap is provided between the release of said brake assembly and the engagement of said clutch assembly.

3. The press drive assembly according to claim 2 wherein, said first biasing member exerts a first load for urging said brake assembly into said applied condition, said second biasing member exerts a second load for urging said clutch assembly into said disengaged condition and said controlling means comprises said first load being different from said second load to produce said specified amount of overlap.

4. The press drive assembly according to claim 2 wherein, said first biasing member exerts a first load for urging said brake assembly into said applied condition, said second biasing member exerts a second load for urging said clutch assembly into said disengaged condition and said controlling means comprises said first load being substantially the same as said second load such that said specified amount of overlap is substantially zero.

5. The press drive assembly according to claim 2 wherein, said first biasing member includes a first plurality of springs, said second biasing member includes a second plurality of springs and said controlling means comprises said second plurality of springs being different in number from said first plurality of springs to produce said specified amount of overlap.

6. The drive assembly according to claim 2 wherein, said first biasing member includes a first plurality of springs, said second biasing member includes a second plurality of springs and said controlling means comprises said second plurality of springs being the same in number as said first plurality of springs such that said specified amount of overlap is substantially zero.

7. The press drive assembly according to claim 1 wherein said securing means includes a housing defining a chamber having an outside portion and an inside portion, said plurality of interleave first friction disks being disposed within said outside portion, said brake assembly further comprising means for supplying oil for said brake assembly, said supplying means providing oil to said outside portion of said chamber and removing oil from said inside portion of said chamber.

8. The press drive assembly according to claim 7 wherein said supplying means comprises a first oil passage extending through said housing for supplying said oil to said outside portion of said chamber and a second oil passage extending through said housing for removing said oil from said inside portion of said chamber.

9. The press drive assembly according to claim 1 wherein said attaching means includes a housing defining a chamber having an outside portion and an inside portion, said plurality of interleave second friction disks being disposed within said outside portion, said clutch assembly further comprising means for supplying oil for said clutch assembly, said supplying means providing oil to said outside portion of said chamber and removing oil from said inside portion of said chamber.

10. The press drive assembly according to claim 9 wherein said supplying means comprises a first oil passage extending through said housing for supplying said oil to said outside portion of said chamber and a second oil passage extending through said housing for removing said oil from said inside portion of said chamber.

11. The press drive assembly according to claim 1 wherein, said clutch assembly further comprises a plurality of springs for urging said clutch assembly from an engaged condition to a disengaged condition and means for maintaining a specified preload for each of said plurality of springs, said maintaining means being adjustable in order to change said specified preload.

12. The press drive assembly according to claim 11 wherein, said preloading means includes a bolt and a spacer.

13. A press drive assembly for a press having a flywheel, a frame and a driveshaft, said drive assembly comprising:
    a brake assembly disposed on a first side of said flywheel, said brake assembly comprising:
        support means for securing said brake assembly to said frame;
        input means for receiving rotary motion from said driveshaft, said input means being rotatable with respect to said support means;
        selectively operable brake means for prohibiting rotation of said input means, said brake means including a plurality of interleaved first friction disks alternately attached, respectively, to said support means and said input means;
    a clutch assembly disposed on a second side of said flywheel, said clutch assembly comprising:
        means for attaching said clutch assembly to said flywheel;
        output means for receiving rotary motion from said flywheel, said output means being secured to said driveshaft and rotatable with respect to said attaching means;
        selectively operable clutch means for transmitting rotational motion of said attaching means to said output means, said clutch means including a plurality of interleaved second friction disks alternately attached, respectively, to said attaching means and said output means;
        a first plurality of springs for urging said clutch assembly from an engaged condition to a disengaged condition; and
        means for maintaining a specified preload for each of said first plurality of springs, said maintaining means being adjustable in order to change said specified preload.

14. The press drive assembly according to claim 13 wherein, said preloading means includes a bolt and a spacer.

15. The press drive assembly according to claim 14 wherein, said brake assembly further comprises a second plurality of springs for urging said brake assembly from a released condition into an applied condition.

16. The press drive assembly according to claim 15 further comprising means for controlling the operational timing of said clutch assembly and said brake assembly such that a specified amount of overlap is provided between the release of said brake assembly and the engagement of said clutch.

17. The press drive assembly according to claim 16 wherein, said controlling means comprises said first plurality of springs being the same in number as said second plurality of springs such that said specified amount of overlap is substantially zero.

18. The press drive assembly according to claim 16 wherein, said controlling means comprises said first plurality of springs being different in number from said second plurality of springs to produce said specified amount of overlap.

19. The press drive assembly according to claim 16 wherein, said first plurality of springs exerts a first load for urging said clutch assembly into said engaged condition, said second plurality of springs exerts a second load for urging said brake assembly into said applied condition and said controlling means comprises said first load being different than said second load to produce said specified amount of overlap.

20. The press drive assembly according to claim 16 wherein, said first plurality of springs exerts a first load for urging said clutch assembly into said engaged condition, said second plurality of springs exerts a second load for urging said brake assembly into said applied condition and said controlling means comprises said first load being the same as said second load such that said specified amount of overlap is substantially zero.

21. A drive assembly for a press having a flywheel, a frame and a drive shaft, said drive assembly comprising:
- a brake assembly disposed on a first side of said flywheel, said brake assembly comprising:
  - support means for rotatably supporting said brake assembly with respect to said driveshaft;
  - input means for receiving rotary motion from said driveshaft, and input means being rotatable with respect to said support means; and
  - selectively operable brake means for locking said input means to said support means, said brake means including a plurality of interleaved first friction disks alternately attached, respectively, to said support means and said input means;
- a clutch assembly disposed on a second side of said flywheel, said clutch assembly comprising:
  - means for attaching said clutch assembly to said flywheel, said support means including a housing defining a chamber having an outside portion and an inside portion, said plurality of interleave first friction disks being disposed within said outside portion, said brake assembly further comprising means for supplying oil for said brake assembly, said supplying means providing oil to said outside portion of said chamber and removing oil from said inside portion of said chamber, said supplying means comprising a first oil passage extending through said housing for supplying said oil to outside portion of said chamber and a second oil passage extending through said housing for removing said oil from said inside portion of said chamber;
  - output means for receiving rotary motion from said flywheel, said output means being secured to said driveshaft and rotatable with respect to said attaching means; and
  - selectively operable clutch means for transmitting rotational motion of said attaching means to said output means, said clutch means including a plurality of interleaved second friction disks alternately attached, respectively, to said attaching means and said output means.

22. A drive assembly for a press having a flywheel, a frame and a drive shaft, said drive assembly comprising:
- a brake assembly disposed on a first side of said flywheel, said brake assembly comprising:
  - support means for rotatably supporting said brake assembly with respect to said driveshaft;
  - input means for receiving rotary motion from said driveshaft, and input means being rotatable with respect to said support means; and
  - selectively operable brake means for locking said input means to said support means, said brake means including a plurality of interleaved first friction disks alternately attached, respectively, to said support means and said input mean;
- a clutch assembly disposed on a second side of said flywheel, said clutch assembly comprising:
  - means for attaching said clutch assembly to said flywheel, said attaching means including a housing defining a chamber having an outside portion and an inside portion, said plurality of interleave second friction disks being disposed within said outside portion, said clutch assembly further comprising means for supplying oil for said clutch assembly, said supplying means providing oil to said outside portion of said chamber and removing oil from said inside portion of said chamber, said supplying means comprising a first oil passage extending through said housing for supplying said oil to said outside portion of said chamber and a second oil passage extending through said housing for removing said oil from said inside portion of said chamber;
  - output means for receiving rotary motion from said flywheel, said output means being secured to said driveshaft and rotatable with respect to said attaching means; and
  - selectively operable clutch means for transmitting rotational motion of said attaching means to said output means, said clutch means including a plurality of interleaved second friction disks alternately attached, respectively, to said attaching means and said output means.

* * * * *